United States Patent
Rao et al.

(10) Patent No.: US 8,663,794 B2
(45) Date of Patent: Mar. 4, 2014

(54) CONTROL OF BIREFRINGENCE DISPERSION UTILIZING NANOCOMPOSITES

(75) Inventors: YuanQiao Rao, Pittsford, NY (US); Janglin Chen, Rochester, NY (US); Tomohiro Ishikawa, Rochester, NY (US)

(73) Assignee: Nitto Denko Corporation, Ibaraki-shi (JP)

( * ) Notice: Subject to any disclaimer, the term of this patent is extended or adjusted under 35 U.S.C. 154(b) by 1171 days.

(21) Appl. No.: 11/208,974

(22) Filed: Aug. 22, 2005

(65) Prior Publication Data
US 2007/0042137 A1 Feb. 22, 2007

(51) Int. Cl.
| | |
|---|---|
| *B32B 5/16* | (2006.01) |
| *B32B 27/30* | (2006.01) |
| *B32B 7/02* | (2006.01) |
| *G02B 1/04* | (2006.01) |
| *B05D 3/02* | (2006.01) |

(52) U.S. Cl.
USPC ........ 428/328; 428/215; 428/220; 427/372.2; 427/388.5

(58) Field of Classification Search
USPC .................. 428/1.3, 328, 215, 220; 977/778; 525/54.3; 427/372.2, 388.5
See application file for complete search history.

(56) References Cited

U.S. PATENT DOCUMENTS

| | | | |
|---|---|---|---|
| 4,528,311 A | | 7/1985 | Beard et al. |
| 6,492,540 B1 * | | 12/2002 | Su et al. ........................ 556/30 |
| 6,565,974 B1 | | 5/2003 | Uchiyama et al. |
| 6,586,515 B1 | | 7/2003 | Koike |
| 6,599,631 B2 | | 7/2003 | Kambe et al. |
| 6,656,990 B2 | | 12/2003 | Shustack et al. |
| 2004/0044127 A1 | | 3/2004 | Okubo et al. |
| 2004/0242823 A1 | | 12/2004 | Sekiguchi et al. |

FOREIGN PATENT DOCUMENTS

| | | |
|---|---|---|
| EP | 0 509 327 A1 | 10/1992 |
| JP | 11-293116 A | 10/1999 |
| JP | 2005-156864 A | 6/2005 |

OTHER PUBLICATIONS

Lee et al. "High-Refractive-Index Thin Films Prepared from Trialkoxysilane-Capped Poly(methylmethacrylate)-Titania Materials." Chem. Mater. 2001, 13. 1137-1142.*
Chen et al. "Synthesis and Characterization of trialkoxysilane-capped poly(methyl methacrylate)-titania hybrid optical thin films". Journal of Materials Chemistry, vol. 9, (1999). pp. 2999-3003.*
Chang et al. "Synthesis and Optical Properties of Polyimide-Silica Hybrid Thin Films". Chem. Mater., vol. 14, (2002). pp. 4242-4248.*
Philipse, A. "Particulate Colloids: Aspects of Preparation and Characterization". Fundamentals of Interface and Colloid Science, vol. 4, (2005). pp. 2.1-2.71.*

(Continued)

*Primary Examiner* — Prashant J Khatri
(74) *Attorney, Agent, or Firm* — Westerman, Hattori, Daniels & Adrian, LLP

(57) ABSTRACT

Nanocomposite films having controlled dispersion, in out-of-plane birefringence, or equivalent retardation are obtained, including films having essentially flat dispersion behavior, reverse dispersion behavior, and non-birefringence dispersion. The nanocomposite comprises film comprises metallic oxide nanoparticles dispersed in a polymer matrix. The present invention also provides a novel method for making and controlling the out-of-plane birefringence dispersion of a film using an organic-inorganic nanocomposite. The nanocomposite material exhibits high optical transmittance, low haze, and is useful in the field of liquid-crystal displays.

21 Claims, 6 Drawing Sheets

(56) References Cited

OTHER PUBLICATIONS

Forms PCT/ISA/220; PCT/ISA/210; PCT/ISA/237 issued in corresponding International Application No. PCT/US2006/030776 mailed Jan. 2, 2007.

Elim H. I. et al., "Ultrafast optical nonlinearity in poly(methylmethacrylate)-TiO$_2$ nanocomposites", Applied Physics Letter, AIP, American Institute of Physics, Apr. 21, 2003, pp. 2691-2693, vol. 82, No. 16, XP012033836 ISSN: 0003-6951, Melville, NY, US.

Japanese Office Action dated Oct. 26, 2010, issued in corresponding Japanese Patent Application No. 2008-526987.

Taiwanese Office Action dated Oct. 29, 2012, issued in corresponding Taiwanese Patent Application No. 095130579, (17 pages). With English Translation.

Taiwanese Office Action dated Feb. 22, 2013, issued in corresponding Taiwanese Patent Application No. 095130579, w/ English translation.

\* cited by examiner

CONTROL OF BIREFRINGENCE DISPERSION UTILIZING NANOCOMPOSITES

FIELD OF THE INVENTION

The invention relates to a method to control birefringence dispersion by organic-inorganic hybridization, methods of making such compositions, and films. The compositions of present invention are useful in the field of display and other optical applications.

BACKGROUND OF THE INVENTION

Liquid crystals are widely used for electronic displays. In these display systems, a liquid crystal cell is typically situated between a polarizer and analyzer. Incident light polarized by the polarizer passes through a liquid crystal cell and is affected by the molecular orientation of the liquid crystal, which can be altered by the application of a voltage across the cell. The altered light goes into the analyzer. By employing this principle, the transmission of light from an external source, including ambient light, can be controlled.

Contrast, color reproduction, and stable gray scale intensities are important quality attributes for electronic displays, which employ liquid crystal technology. The primary factor limiting the contrast of a liquid crystal display (LCD) is the propensity for light to "leak" through liquid crystal elements or cells, which are in the dark or "black" pixel state. The contrast of an LCD is also dependent on the angle from which the display screen is viewed. One of the common methods to improve the viewing angle characteristic of LCDs is to use compensation films. Birefringence dispersion is an essential property in many optical components such as compensation films used to improve the liquid crystal display image quality. Even with a compensation film, the dark state can have undesirable color tint such as red or blue, if the birefringence dispersion of the compensation film is not optimized.

A material that displays at least two different indices of refraction is said to be birefringent. In general, birefringent media are characterized by three indices of refraction, $n_x$, $n_y$, and $n_z$. The out-of-plane birefringence is usually defined by $\Delta n_{th} = n_z - (n_x + n_y)/2$, where $n_x$, $n_y$, and $n_z$ are indices in the x, y, and z direction, respectively. Indices of refraction are functions of wavelength ($\lambda$). Accordingly, out-of-plane birefringence, given by $\Delta n_{th} = n_z - (n_x + n_y)/2$ also depends on $\lambda$. Such a dependence of birefringence on $\lambda$ is typically called birefringence dispersion.

Birefringence dispersion is an essential property in many optical components such as compensation films used to improve the liquid crystal display image quality. If nx=ny, the media is called C-plate and $\Delta n_{th} = n_z - n_x$, or equivalently $\Delta n_{th} = n_z - n_y$.

Adjusting $\Delta n_{th}$ dispersion, along with in-plane birefringence ($n_x - n_y$) dispersion, is critical for optimizing the performance of optical components such as compensation films. The $\Delta n_{th}$ can be negative (102) or positive (104) throughout the wavelength of interest, as shown in FIG. 1. In most cases, film made by casting polymer having positive intrinsic birefringence, $\Delta n_{int}$, gives negative $\Delta n_{th}$. Its dispersion is such that the $\Delta n_{th}$ value becomes less negative at longer wavelength (102). On the other hand, by casting polymer with negative $\Delta n_{int}$, one obtains a positive $\Delta n_{th}$ value with less positive $\Delta n_{th}$ value at longer wavelength (104). The dispersion behavior, in which the absolute value of $\Delta n_{th}$ decreases with increasing wavelength, is called "normal" dispersion. In contrast to normal dispersion, it is often desirable to have $\Delta n_{th}$ essentially constant over visible wavelength $\lambda$ (between 400 nm and 650 nm) (curves 106 and 108 in FIG. 1). Hereinafter, the term "essentially constant" means that for at any two wavelengths $\lambda_4 \approx \lambda_5$ such that 400 nm<$\lambda_4$, $\lambda_5$<650 nm, we have 0.95<|$\Delta$nth($\lambda_4$)|/|$\Delta$nth($\lambda_5$)|<1.050. Particularly useful media are ones having low and constant $\Delta n_{th}$ satisfying |$\Delta n_{th}$($\lambda$)|<0.0001 for wavelength $\lambda$ satisfying 400 nm<$\lambda$<650 nm (curve 110 in FIG. 1). Thus, such media exhibit essentially zero birefringence.

In still other cases, it is desirable for the absolute value of $\Delta n_{th}$ to increase at longer wavelength. Such behavior is called "reverse" dispersion (curves 202, 204 in FIG. 2).

These cases of different behaviors in $\Delta n_{th}$ in principle can be achieved by suitable combination of two or more layers having difference dispersion in $\Delta n_{th}$. Such an approach, however, is difficult, as one has to carefully adjust the thickness of each layer. Also, extra process steps are added to manufacturing.

U.S. Pat. No. 6,565,974 discloses controlling birefringence dispersion by means of balancing the optical anisotropy of the main chain and side chain group of a polymer. This method enables the generation of a polymer having smaller birefringence (or equivalent retardation value) at shorter wavelength, a reverse dispersion material. Polymeric materials are flexible and easy to process. However, the chemical structure of the polymer, which is mainly composed of carbon hydrogen, limits the range of birefringence behavior including dispersion. This makes control of birefringent dispersion difficult, even by mixing two polymers, co-polymerization, and other possible methods. Thus, a polymeric entity alone has only a limited capability for controlling birefringent behavior.

Inorganic materials have various intrinsic birefringence behaviors. Some inorganic materials show positive while others exhibit negative intrinsic birefringence. The Table below shows the intrinsic birefringence at $\lambda$=632 nm of various inorganic materials. These are uniaxial materials and, thus, have extraordinary ($n_e$) and ordinary ($n_o$) indices of refraction wherein the intrinsic birefringence $\Delta n_{int}$ is defined as $\Delta n_{int} = n_e - n_o$.

TABLE 1

| Calcite | $CaCO_3$ | $\Delta n_{int}$ = −0.154 |
|---|---|---|
| Magnecite | $MgCO_3$ | $\Delta n_{int}$ = −0.192 |
| Geikielite | $MgTiO_3$ | $\Delta n_{int}$ = −0.360 |
| Rutile | $TiO_2$ | $\Delta n_{int}$ = +0.287 |
| Cassiterite | $SnO_2$ | $\Delta n_{int}$ = +0.097 |

As the above Table shows, the inorganic materials exhibit a wide range of birefringence magnitude. They also have various dispersion behaviors and, thus, they are more versatile than polymeric materials for optical applications.

Although inorganic materials offer versatile birefringence properties, they are costly and difficult to process. In order to utilize their birefringent behavior, however, the inorganic materials have to be single crystalline of appreciative size, or else one sees only averaged isotropic effects.

It would be very much desired to discover a material that combines the processability of polymers and the versatility of inorganic materials with respect to $\Delta n_{th}$ dispersion control, in order to provide more latitude than combinations of polymers. It would be especially desirable to be able to easily make such materials into films that can be used as compensation films for LCDs.

Many efforts have been made to make organic-inorganic hybrid materials. One method is to blend inorganic nanoparticles with a binder. Unfortunately, the undesirable aggregation of the nanoparticles in such materials when made into films can result in non-transparency. Such films are not useful for optical applications which require high transparency and low haze.

U.S. Pat. No. 6,599,631 and U.S. Pat. No. 6,656,990 describe blending polymer and inorganic particles to form hybrid materials. Both patents require specially prepared particles with well-controlled particle size and surface treatment of the particles. These very specific requirements make these methods of forming hybrid materials unattractive as a low-cost process.

U.S. Pat. No. 6,586,515 to Koike disclose non-birefringent optical films made from a nanocomposite in which a fine inorganic substance is oriented in the same direction as the linked chains of a resin oriented under an external force, wherein the birefringence of the inorganic substance cancels out the birefringence of the resin. To solve the problem of dispersibility, the inorganic substance is subjected to a surface treatment for dispersion in the resin prior to kneading the inorganic substance into the resin material. To develop effective birefringence, the inorganic substance comprise particles having an elongated shape, including acicular, cylindrical, plate, columnar, and ellipsoid shape.

PROBLEM TO BE SOLVED BY THE INVENTION

Accordingly, it would be desirable to develop a method for controlling the $\Delta n_{th}$ dispersion by combining polymer and inorganic materials, in order to obtain a material with desirable $\Delta n_{th}$ dispersion behavior. It would be further desirable to obtain a C-plate, with desired $\Delta n_{th}$ dispersion behavior, for use in a display device.

SUMMARY OF THE INVENTION

It is an object of the invention to obtain films having the property of reverse dispersion, in out-of-plane birefringence, or equivalent retardation.

It is another object of the invention to obtain films having essentially flat dispersion property, in out-of-plane birefringence, or equivalent retardation.

These and other objects of the invention are accomplished by a nanocomposite comprising polymer and nanoparticles of a metal oxide.

More particularly, one embodiment is directed to a nanocomposite film comprising metallic oxide nanoparticles dispersed in a polymer matrix comprising at least one polymer wherein said film simultaneously satisfies the following three conditions:

$$|\Delta n_{th}(\lambda_2)| - |\Delta n_{th}(\lambda_1)| > 0 \text{ for } 400 \text{ nm} < \lambda_1 < \lambda_2 < 650 \text{ nm} \quad (i)$$

$$|n_x - n_y| < 0.0001 \quad (ii)$$

$$\Delta n_{th}(450 \text{ nm})/\Delta n_{th}(550 \text{ nm}) < 0.98, \text{ preferably } 0.95 \quad (iii)$$

Such nanocomposites are useful for obtaining reverse dispersion behavior in an optical film.

Another aspect of the present invention relates to a nanocomposite film comprising metallic oxide nanoparticles dispersed in a polymer matrix comprising at least one polymer, wherein said film satisfies the following condition:

$$0.95 < |\Delta nth(\lambda_4)|/|\Delta nth(\lambda_5)| < 1.050, \text{ for all } \lambda_4 \approx \lambda_5, \\ \text{wherein } 400 \text{ nm} < \lambda_4, \lambda_5 < 650 \text{ nm} \quad (iv)$$

Such nanocomposites are useful for obtaining relatively flat birefringence dispersion in an optical film.

Yet another aspect of the present invention relates to a nanocomposite film comprising metallic oxide nanoparticles dispersed in a polymer matrix comprising at least one polymer, wherein said film satisfies the following condition:

$$|\Delta nth(\lambda_6)| < 0.0001 \text{ for } 400 \text{ nm} < \lambda_6 < 650 \text{ nm} \quad (v)$$

Such nanocomposites are useful for obtaining essentially zero birefringence dispersion in an optical film.

The present invention also provides a novel method for making and controlling the out-of-plane birefringence dispersion of a film using an organic-inorganic nanocomposite. The nanocomposite material exhibits high optical transmittance and low haze.

BRIEF DESCRIPTION OF THE DRAWINGS

The embodiments are best understood from the following detailed description when read with the accompanying drawing figures. It is emphasized that the various features are not necessarily drawn to scale. In fact, the dimensions may be arbitrarily increased or decreased for clarity of discussion.

DETAILED DESCRIPTION OF THE INVENTION

The invention has been described with reference to preferred embodiments. However, it will be appreciated that variations/modifications of such embodiments can be effected by a person of ordinary skill in the art without departing from the scope of the invention.

As mentioned above, the present invention provides a simple method for forming materials having desired out-ofplane birefringence ($\Delta n_{th}$) behavior. The invention further provides a method of processing such materials to produce a coating, free-standing film, or article having the desired $\Delta n_{th}$ dispersion behavior. The invention can be used to form flexible film that has high optical transmittance or transparency and low haze. These and other advantages will be apparent from the detailed description below.

Figure 3:
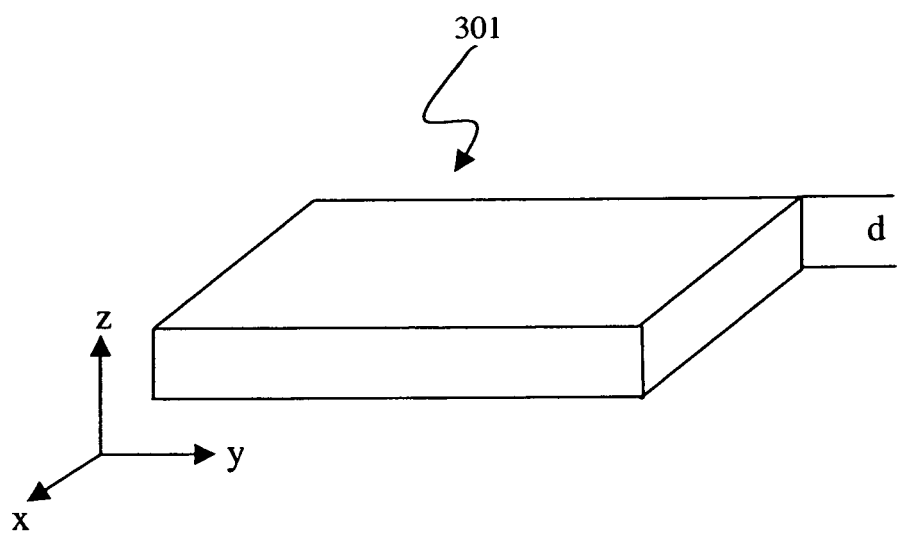
FIG. 3 illustrates an exemplary film having a thickness d and dimensions in the "x", "y," and "z" directions which x and y lie perpendicularly to each other in the plane of the film, and z is normal the plane of the film.

With reference to FIG. 3, the following definitions apply to the description herein:

The letters "x," "y," and "z" define directions relative to a given film (301), where x and y lie perpendicularly to each other in the plane of the film, and z is normal the plane of the film.

The term "optic axis" refers to the direction in which propagating light does not see birefringence. In polymer material, the optic axis is parallel to the polymer chain.

The terms "$n_x$," "$n_y$," and "$n_z$" are the indices of refraction of a film in the x, y, and z directions, respectively.

A "C-plate" refers to a plate or a film in which $n_x=n_y$, and $n_z$ that differs from $n_x$ and $n_y$. Usually, when materials are caste into a film, the film possesses the property of a C-plate.

The term "intrinsic birefringence ($\Delta n_{int}$)" with respect to a polymer or mineral refers to the quantity defined by ($n_e-n_o$), where $n_e$ and $n_o$ are the extraordinary and ordinary index of the polymer or mineral, respectively. Intrinsic birefringence of a polymer is determined by factors such as the polarizabilities of functional groups and their bond angles with respect to the polymer chain. Indices of refraction $n_x$, $n_y$, and $n_z$ of a polymer article, such as a film, are dependent upon manufacturing process conditions of the article and $\Delta n_{int}$ of the polymer.

The term "out-of-plane phase retardation ($R_{th}$)" of a film is a quantity defined by $[n_z-(n_x+n_y)/2]d$, where d is the thickness of the film 301 shown in FIG. 3. The quantity $[n_z-(n_x+n_y)/2]$ is referred to as the "out-of-plane birefringence ($\Delta n_{th}$)".

The term "in-plane birefringence" with respect to a film 301 is defined by $|n_x-n_y|$.

The term "amorphous" means a lack of long-range order. Thus, an amorphous polymer does not show long-range order as measured by techniques such as X-ray diffraction.

For a polymeric material, the indices $n_x$, $n_y$, and $n_z$ result from the $\Delta n_{int}$ of the material and the process of forming the film. Various processes, e.g., casting, stretching and annealing, give different states of polymer chain alignment. This, in combination with $\Delta n_{int}$, determines $n_x$, $n_y$, $n_z$. Generally, solvent-caste polymer film exhibits small in-plane birefringence ($<10^{-4}$ to $10^{-5}$ at $\lambda=550$ nm). Depending on the processing conditions and the kind of polymer, however, $\Delta n_{th}$ can be larger.

Figure 4A:
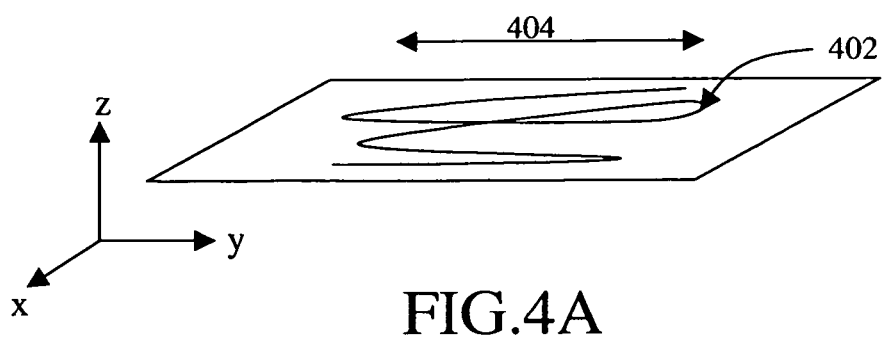
FIG. 4A shows a polymeric film in which the polymer chains have a statistically averaged alignment direction.
Figure 4B:
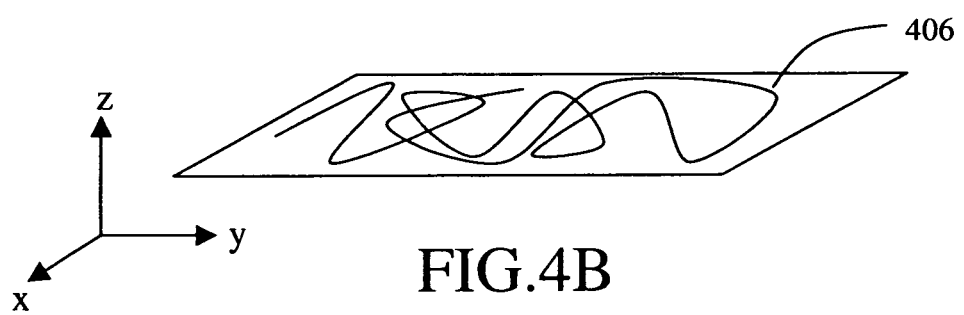
FIG. 4B shows a polymeric film in which the polymer chains are randomly oriented but statistically confined in the x-y plane of the film.

The mechanism of generating $\Delta n_{th}$ can be explained by using the concept of the order parameter, S. As is well known to those skilled in the art, the out-of-plane birefringence of the polymer film is given by $\Delta n_{th}=S\Delta n_{int}$. As mentioned above, $\Delta n_{int}$ is determined only by the properties of the polymer, whereas the process of forming the film fundamentally controls S. S is usually positive and $S\leq 1$, if the polymer chains (402) in a polymeric film have a statistically averaged alignment direction (404), as shown in FIG. 4A. On the other hand S takes a negative value, if the polymer chains (406) in a polymeric film is randomly oriented but it is statistically confined in the x-y plane, as shown in FIG. 4B. For example, solvent castings of polymers can generate such a random in-plane orientation of polymer chain. In this case, we have two indices of refraction, $n_x$ and $n_y$, essentially equal due to the randomness in the film plane (x-y plane in FIG. 3). However, $n_z$ will differ since the polymer chain is more or less confined in the x-y plane. In order to obtain negative $\Delta n_{th}$, a polymer having positive $\Delta n_{int}$ is used, while for positive $\Delta n_{th}$, ones with negative $\Delta n_{int}$ is employed. In both cases, we have the property of a C-plate having nx=ny. Nanocomposites films according to the present invention relate to films as in FIG. 4B in which S is negative, in which the polymer matrix is not oriented under an external force, unlike the films made by extrusion or injection molding in U.S. Pat. No. 6,586,515 to Koike. On the other hand, the in-situ formation of the nanoparticles in the present invention is believed to contribute to an alignment of the particles that contributes to its effective birefringence without the use of an external force.

Figure 1:
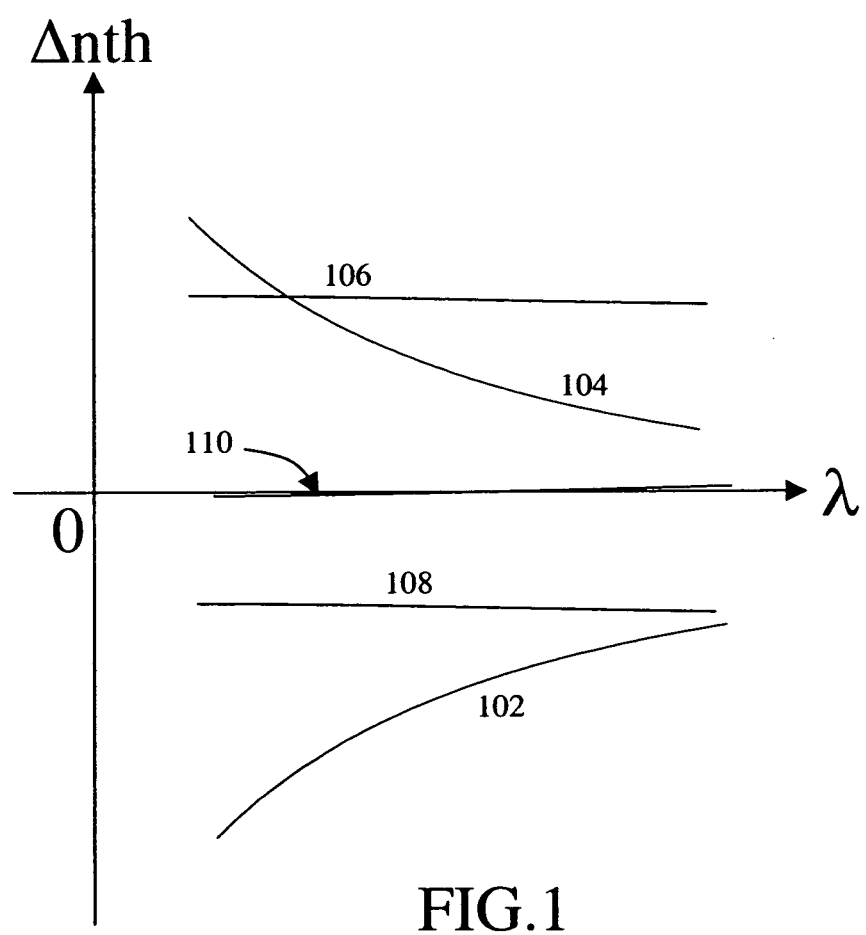
FIG. 1 is a graph showing various birefringence dispersion behaviors, including positive and negative out-of-plane dispersion and essentially constant dispersion and normal dispersion.
Figure 2:
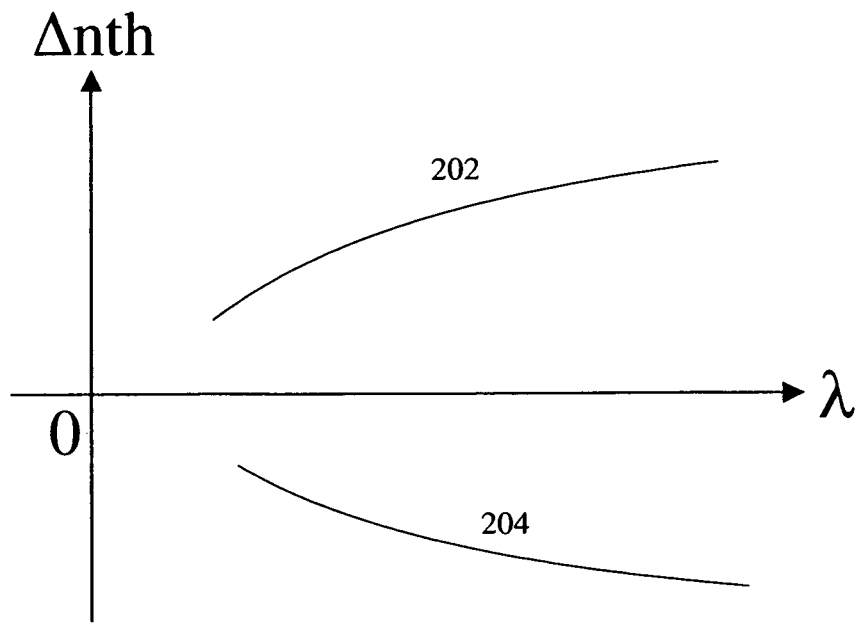
FIG. 2 is a graph showing positive and negative out-of-plane birefringence exhibiting characterized by reverse dispersion behavior.

The $\Delta n_{int}$ dispersion behavior of most of polymer materials is normal, i.e., the absolute values of birefringence decreases at longer $\lambda$ as curve 102, 104 in FIG. 1. This also gives normal dispersion behavior in $\Delta$nth. In accordance with the present invention, the dispersion behavior of a film is controlled by combining polymer with inorganic nanoparticles. It is important that the size of inorganic nanoparticles is sufficiently smaller than $\lambda$ to avoid an undesirable increase in haze. Various combinations of polymer and inorganic nanoparticles can be considered for control of birefringence dispersion. As mentioned above, the $\Delta n_{th}$ is generated by the random orientation of the optic axis of the polymer chains or segments that are confined in the plane of the film, as shown in FIG. 4B. Then, the relative orientation of the optic axes of the polymer that is usually parallel to the polymer chain and inorganic nanoparticles may not be well defined. Thus, only the degree of x-y plane confinement of the optic axes of each component can be defined. This is different from in-plane retardation case, where the combination of the relative orientation of the optic axes in the x-y plane and the sign of $\Delta n_{int}$ of the inorganic and organic materials give four possible ways to control the dispersion. For multiple components cases, the resulting $\Delta n_{th}$ is obtained from the volume-averaged addition of the $\Delta n_{int}$ of polymer and inorganic nanoparticle, which is weighed by the S of each component.

For example, the a combination of polyester and $TiO_2$, both polyester and $TiO_2$ have positive $\Delta n_{th}$ and gives negative $\Delta n_{th}$, if their optic axes have random orientation confined in the x-y plane. The composite of the two have the $\Delta n_{th}$ that is the volume fraction averaged summation at every $\lambda$ provided that they have the same S. On the other hand, the combination of polystyrene and $TiO_2$ is different. Polystyrene has negative inherent birefringence and, thus, positive $\Delta n_{th}$. Therefore, adding $TiO_2$ would change not only the dispersion behavior of the polystyrene but also the sign of negative $\Delta n_{th}$, if sufficient $TiO_2$ is added.

As mentioned above, a key point of forming the organic-inorganic nanocomposite is the scale of mixing. If the characteristic size of the inorganic nanoparticle in the polymer matrix is not sufficiently lower than $\lambda$ of the light, such nanoparticles scatter light, creating haze thus lower the transmission. In applications involving visible light such as LCDs or other for ms of display, $\lambda$ can be as short as 350 nm. Considering various factors, the preferred size of the nanoparticle should be less than 200 nm in all dimensions.

The nanocomposite materials used in the present invention comprise nanoparticles dispersed in the matrix of a polymer material. Notably, the nanoparticles are formed in-situ within the polymer material. In accordance with one embodiment of the method, a polymer material and a nanoparticle precursor are mixed in an organic solvent, which can comprise mixtures, to form a coating solution. The solvent substantially dissolves the polymer and substantially prevents the nanoparticle precursor molecules from reacting with one another in the coating solution. Beneficially, agglomeration of the nanoparticle precursor or a subsequent intermediate product is substantially avoided in the coating solution.

In accordance with one embodiment, a nanocomposite material is made by generating inorganic nanoparticles in-situ within a polymer matrix as follows:

(a) forming a coating solution of a nanoparticle precursor and polymer dissolved in a substantially non-aqueous carrier liquid, comprising one or more organic solvents, wherein the nanoparticle precursor is a condensation polymerizable reactive metal compound comprising a metallic atom and at least two hydrolyzable leaving groups, and wherein the components of the coating solution are selected such that the nanoparticle precursor is essentially stable and unreacted prior to applying the coating solution onto a substrate to form a film;

(b) applying the coating solution onto a substrate to form a liquid-fluid coating and then removing organic solvent from the coating to form a gel;

(c) converting the nanoparticle precursor, by hydrolysis and polycondensation reactions, into nanoparticles in a matrix of the polymer to form a nanocomposite; and (d) drying the nanocomposite to remove remaining organic solvent from the nanocomposite (during which further condensation reaction may occur).

The morphology of the nanoparticle may depend on its loading in the polymer matrix. In a first embodiment, usually involving relatively lower loadings of nanoparticle material in the polymer matrix, the nanocomposite, in the final product, preferably is characterized by the presence of nanoparticles predominantly having a maximum dimension of not more than 50 nm, preferably at a concentration of more than 2.0 percent by weight of the nanoparticulate condensation product in the nanocomposite.

In a second embodiment, usually involving relatively higher loadings of nanoparticle material in the polymer matrix, the nanocomposite, in the final product, is preferably characterized by the presence of a plurality of nanoparticles having a shorter dimension of not more than 50 nm, at a concentration of at least 5.0 weight percent by weight of the nanoparticulate condensation product in the nanocomposite. Among various morphologies, the plurality of nanoparticles may be in the form of elongated strands or dense packing.

Without wishing to be bound by theory, it is believed that the formation of such nanoparticles is obtained by substantially delaying their formation until a gel of the polymer material is formed, after the organic solvent is evaporated to some extent, while the nanoparticle precursor is homogenously mixed in a matrix of the polymer. By slowing its diffusion in the gel, the polycondensation product is prevented from aggregating into larger particles. Reaction of the nanoparticle precursor or an intermediate product, and especially nanoparticle formation, should be avoided before coating, preferably before gelling. Similarly, it is preferred that nanoparticles greater than 5 nm, more preferably nanoparticles greater than 2 nm, are substantially absent from the coating solution prior to coating, more preferably prior to gelling of the coated solution.

Obtaining a homogenous mixture of the nanoparticles and delaying their formation and/or aggregation in the film can be achieved or promoted by a variety of factors, such as the use of (1) a relatively less reactive precursor, (2) a polymer more interactive or compatible with the precursor or intermediate during nanoparticle formation, (3) a more favorable solvent as described below, and/or (4) an alcohol to prevent or limit premature hydrolysis. Avoiding (or limiting) the use of a catalyst can also be a factor in obtaining the present nanocomposite, particularly with more reactive precursors. Another factor that can be used to obtain the present nanocomposite is controlling (or limiting) the presence of water necessary for the hydrolysis of the precursor. For example, reaction can be delayed by strictly excluding water from the coating solution and, instead, introducing water into the coated film by employing ambient humidity, as explained below. The ratio of water to precursor can affect the speed or timing of nanoparticulate formation.

Undesirable reaction or nanoparticle formation, not sufficiently delayed, may be evidenced by relatively larger particle size of the nanoparticles and, in the case of coating on a moving web, by elongation of the nanoparticles in the direction of web movement, indicating nanoparticles already substantially formed in the coating solution when applied to the moving web.

Because of their highly reactive nature, transition metal alkoxides and the like can undergo hydrolysis with the assist of gaseous water (moisture), and without a catalyst or catalysts. In one preferred embodiment, the nanoparticle precursors used in the present method, after coating a homogenous mixture thereof on a substrate, are subjected to a hydrolysis reaction that is carried out employing ambient humidity to provide the water necessary for hydrolysis in the coating. Accordingly, the water necessary for hydrolysis is preferably not contained in the coating solution prior to coating. The hydrolysis fosters the conversion of the nanoparticle precursor to a nanoparticle intermediate. A further condensation reaction produces the nanocomposite material. As will become clearer as the present description continues, the hydrolysis and condensation reactions do not necessarily occur sequentially, but rather may occur substantially simultaneously.

In one embodiment, the coating solution used to form the reaction mixture for the nanocomposite comprises the nanoparticle precursor in an amount of at least 5 weight percent relative to the total polymer, preferably in an amount of 6 to 33 weight percent. In a second embodiment, in which higher loadings or nanoparticles are desired, the coating solution used to form the reaction mixture for the nanocomposite comprises the nanoparticle precursor in an amount of at least 5 weight percent relative to the total polymer, preferably in an amount of 6 to 33 weight percent. Typically, the coating solution is applied to a substrate by curtain coating, casting or other conventional or known techniques to form a nanocomposite material. The term "coating" is used in a generic sense to all these methods for making a thin film of the coating solution.

The present method further includes removing solvent after applying the coating solution to a substrate, which may be a moving web. Illustratively, the removal of the solvent occurs substantially continuously after forming a film of the coating solution, in accordance with a preferred embodiment. However, the removal of the solvent, after forming the solution, may occur either substantially continuously or in discrete steps or stages. Optionally solvent may be partially removed prior to forming the film, as long as the gel point of the coating solution is not reached before forming the film.

The solvent is preferably removed relatively rapidly, so that the gel point is reached before substantial reaction or aggregation of the precursor in the coating. Relatively rapid removal of the solvent, thus, helps to produce and substantially preserve the homogenous dispersion of the particles that are formed.

Hydrolysis and condensation are effected during the removal of solvent from the coating solution. Preferably, inappreciable, if any, hydrolysis or condensation is effected in the solution before a sufficient amount of solvent is removed to create a gel mixture. Accordingly, the bulk of the hydrolysis and condensation preferably occurs when the solvent-depleted solution is in the gel form. (As indicated above, the hydrolysis and condensation, although sometimes described as sequential steps or reactions, are usually concurrent to some extent.)

In a preferred embodiment, the nanoparticle precursor is reacted in the absence of a catalyst. Catalysts are to be avoided when the nanoparticles precursor is a very reactive organometallic compound. However, for relatively less reactive nanoparticle precursor compounds, an effective amount of catalyst can be added to the coating solution, although it may still be desirable to exclude water from the coating solution, so that the nanoparticle formation is delayed until after a gel is obtained.

Catalyst refers to a chemical compound that changes the reaction kinetics in the formation of the nanoparticles. For example, catalysts may include an acid or base compound. More specifically, catalysts may include acetic acid, HCl, nitric acid, KOH, amines and others known to those skilled in the art.

The addition of amounts of liquid water directly to the coating solution should be avoided with respect to the preferred nanoparticles precursors, in order to prevent premature conversion to nanoparticles. Preferably, the total amount of water necessary for hydrolysis of the nanoparticle precursor has not been added to the coating solution prior to coating. More preferably, the water is preferably added to the coating in sufficiently small or trace amounts after a gel containing the dispersed precursor has formed. Water should be carefully controlled, however, because it acts not only as a reactant for hydrolysis, but also as an initiator. Water is also by-product of the condensation.

As mentioned above, a preferred method for controlling hydrolysis of the nanoparticle precursor in the coating solution is to add water for hydrolysis from controlled humidity in the environment, which water can be drawn into the gel either through vapor diffusion or condensation at the surface of the coated solution where solvent is being evaporated.

By using humidity as a source of water for hydrolysis, the coating solution can comprises less than 25 weight percent, relative to the nanoparticle precursor, of water, preferably less than 10 weight %. (In contrast, US Patent No. 2004/004127 to Okubo et al., in Example 1, employs 45%, although 0.2% based on total solution in view of the low amount of nanoparticle precursor and resulting nanoparticles.)

In one preferred embodiment, in which the nanoparticle precursor is a transition metal alkoxide, the moisture content of the environment is suitably in the range of about 1.0% relative humidity (RH) to about 80.0% RH. In one particular embodiment, the relative humidity is about 5.0% to about 50.0% RH.

In any case, the addition of water, in any form (liquid or humidity), to generate nanoparticles, or a gel thereof, before the nanoparticle precursor is homogenously dispersed in the polymer matrix of the solution should be avoided. As mentioned above, the nanoparticle precursor and/or intermediate thereof are preferably in a gel of the polymer matrix before substantial conversion to the nanoparticles occurs.

The hydrolyzed precursor becomes more hydrophilic as it is hydrolyzed and tends to clump together away from the relatively hydrophobic polymer. Although the hydrolysis is very fast, the diffusion of the hydrolyzed precursor or intermediate in the solution is very slow when a gel is formed, thereby maintaining dispersion of the particle precursor or intermediate in the polymer matrix of the gel, prior to conversion into nanoparticles. The nanoparticles that are formed are, thereby prevented from aggregating too much.

A gel point is reached in the coated solution (i.e., liquid coating prior to solidification) due to the polymer forming tangled chains as solvent is evaporated. The viscosity of the solution is increased by polymer chain entanglement before the precursor is extensively converted to particles, thereby limiting or slowing diffusion of the nanoparticle precursor or intermediates. Diffusion of the nanoparticle precursor or intermediates can also limited by gelation in which the metal alkoxide or other type of precursor reacts to form a three dimensional structure that prevents flow. However, an extended chain cluster of the precursor is preferably limited prior to gel formation by polymer entanglement, since otherwise the polymer may coil back due to incompatibility of the cluster with the precursor.

A gel is characterized by a physical integrity and a viscosity above $10^6$ cp at an oscillating frequency of $1\ s^{-1}$ using a dynamic rheometer.

As mentioned above, the nanocomposite film comprises nanoparticles dispersed in a polymer matrix, which nanoparticles are the product of a condensation polymerizable reactive metal oxide compound, comprising a metallic atom and at least two hydrolyzable leaving groups.

The nanoparticles according to the present invention can be characterized either by distinct boundaries or by nanoparticles in the form of nano-regions, showing dark contrast and indistinct boundaries or varying degree (depending on the resolution) in a TEM micrograph.

Since the nanoparticle may have a different (usually darker) electron density than the matrix of the polymer, a density gradient can form and less distinct boundaries for the nanoparticles or nano-regions can result. Separate nano-regions can occasionally appear to blend into each other, although the nanocomposite substantially comprises nanoparticles that are individually or separately dispersed.

Without wishing to be bound by theory, less distinct nanoparticles or cloudy nano-regions in the nanocomposite may be very fine particles under 5 nm, more probably under 2 nm, that may have flocculated but have not fully condensed or aggregated to larger or particles that are more distinctly bounded. The interface of the nanoparticle and the matrix of the polymer, as defined by the electron density contrast can be either abrupt or gradual. In the case of abrupt electron density change, there is a sharper interface and a traveling electromagnetic wave experiences two different media; while in the case of gradual electron density change, the interface can be more subtle, and the traveling electromagnetic wave experiences more continuous alternation such that, for example, the scattering due to the change in refractive index can be reduced. Thus, in certain embodiments, it is beneficial that the electron density contrast is more gradual, particularly for relatively larger nanoparticles.

In one preferred embodiment, the nanocomposite is characterized by the presence of nanoparticles having an average maximum dimension of not more than 50 nm, preferably at a concentration of more than 2.0 percent by weight of the nanoparticulate condensation product in the nanocomposite, as evident by transmission electron microscopy (TEM). (The concentration of the nanoparticles can be determined according to thermal gravimetric analysis, or less approximately on a theoretical basis assuming 100 percent yield of the precursor.) Such preferred nanocomposites can also be characterized, as determined by electron transmission microscopy, by nanoparticles having an average equivalent diameter of not more than 50 nm, in which nanoparticles having a smallest dimension of more than 50 nm are substantially absent or relatively uncharacteristic of the nanoparticles, as determined by transmission electron microscopy.

In a second embodiment, the nanocomposite, especially at higher loadings, can be characterized by the presence of a plurality of nanoparticles having a shorter dimension of not more than 50 nm, as evident by transmission electron microscopy (TEM). In this case, the total concentration of nanoparticles in the nanocomposite is usually at least 5.0 percent by weight, as determined according to thermal gravimetric analysis, or less approximately on a theoretical basis assuming 100 percent yield of the precursor to the metal oxide condensation product. In related embodiments, the concentration of the nanoparticles is 5.0 to 25 percent by weight of the nanocomposite, more preferably, 10 to 20 percent by weight of the nanocomposite. The nanoparticles can be in the form of elongated strands or closely packed nano-regions, which may depend on the concentration of the nanoparticulate condensation product and the particular materials used to make the nanocomposite. The nanocomposites, in such embodiments, may be characterized, as evident by transmission electron microscopy (TEM), by indistinctly bounded nanoparticles having a shorter dimension, or width, in the plane of the TEM, of not more than 50 nm. Further, the nanoparticles in such embodiments can be in the form of nano-regions showing dark contrast and indistinct boundaries in a TEM micrograph. In one particular embodiment, nanocomposites comprise a plurality of nanoparticles in the form of elongated strands, the width of which is substantially uniform along the elongation, the width being in the range of 5 to 50 nm, preferably 10 to 25 nm. In a second particular embodiment, nanocomposites comprise nanoparticles, as determined by electron transmission microscopy, that are densely packed, including a plurality of nano-regions having a shorter dimension of not more than about 50 nm and all dimensions less than 200 nm. In such embodiments, more than 50 percent of the TEM micrograph may show darkly contrasting regions, indicating a mixture of metal oxide with polymer.

In the case of nanocomposites characterized by elongated strands, the nano-regions may appear in the form of, or may be described as, filamentous clouds, woolly threads, and/or short chains of beads. In the case of nanocomposites characterized by densely packed nano-regions, the nano-regions may appear in the form of, or may be described as, roughly rectangular or block-like, in which at least two sides are mostly substantially flat. Since the nanoparticle may have a different (usually darker) electron density than the matrix of the polymer, a density gradient can form and less distinct boundaries for the nanoparticles or nano-regions results. Separate nano-regions can occasionally blend into each other, which may be either fact or appearance, for example if nano-regions of different depth appear in the same plane.

Preferably, nanocomposites in which the nanoparticles are in the form of elongated strands may be characterized by an average aspect ratio greater than 5, whereas nanoparticles present in dense packing may have an average aspect less than 5, in which the maximum diameter is preferably less than about 200 nm, more preferably less than 100 nm, most preferably less than about 50 nm. Since, in optical applications of nanocomposite materials, it is often useful to have nanoparticles having no dimension greater than a fraction of the wavelength of light traversing the nanocomposite, nanoparticles of the ranges mentioned reduces scattering of light and benefits optical characteristics such as transparency.

For nanoparticles that are characterized by an aspect ratio greater than 5 (elongated strands), the maximum dimension is preferably less than about 400 nm, more preferably less than about 200 nm. In certain embodiments such nanoparticles have maximum dimensions in the range of about 10 to 100 nm. A preferred minimum dimension in the non-elongated or shorter direction of such nanoparticles can vary from 1 nm to 10 nm.

The nanoparticle precursor used to make the present nanocomposite may be a metal alkoxide, metal acetate, metal acetylacetonate, or halogenated metal. Preferably, however, the precursor is an organometallic compound.

In accordance with one preferred embodiment, the metal atom in the nanoparticle precursor is a transition metal. The transition metal may be Ti, Ta, Zr, Zn, Ta, Hf, Cr, V and W. Alkaline-earth metals, rare-earth metals and Group 3B, 4B and 5B metals are also useful. For example, the metal may be a non-transition metal such as Al, Tl, Sn, Sb, Ba, In, Pb and Ge. Barium, a Group 2A metal, may also be used. (Metals are defined to include elements that are electrically conductive in the pure state and do not include elements that form semiconductors or insulators such as silicon.) Preferred metals are aluminum, indium, tin, titanium, zirconium, and hafnium. The nanoparticles in the present nanocomposite, resulting from the reaction of such nanoparticle precursors, are substantially comprise the corresponding oxides of these metals, as will be readily understood by the skilled artisan. The most preferred metal is titanium. Single metal oxides are characterized by positive $\Delta n_{int}$. For example, rutile titanium oxide exhibits $\Delta n_{int}$=+0.287. Double metal oxides are characterized by negative $\Delta n_{int}$. For example, $BaTiO_3$, $SrTiO_3$ al oxides exhibit negative $\Delta n_{int}$. Preferably, nanoparticle precursors comprising silicon instead of a metallic atom are substantially absent from the coating solution used to make the nanocomposite. Silicon oxides have only weak birefringence.

Illustratively, ligands or groups that are hydrolyzed include alkoxide, acetate, and halogen. Preferably, the leaving or hydrolyzable groups in the precursor compound contain three to six carbon atoms.

Illustratively, optional substituents that are not hydrolyzed include, for example, substituted or unsubstituted alkyl groups and substituted or unsubstituted aryl groups. The substituents of the alkyl group and the aryl group can include an alkyl group (for example, a methyl group, an ethyl group, etc.); a cycloalkyl group (for example, a cyclopentyl group, a cyclohexyl group, etc.); an aralkyl group (for example, a benzyl group, a phenyl group, etc.); an aryl group (for example, a phenyl group, a naphthyl group, etc.); a heterocyclic group (for example, a furanyl group, a thiophenyl group, a pyridyl group, etc.); an alkoxy group (for example, a methoxy group, an ethoxy group, etc.); an aryloxy group (for example, a phenoxy group, etc.); an acyl group; a halogen atom; a cyano group; an amino group; an alkylthio group; a glycidyl group; a glycidoxy group; a vinyl group; a fluorine-containing alkyl group; and a fluorine-containing aryl group.

For example, titanium-containing compounds useful as a nanoparticle precursor include titanium methoxide, titanium ethoxide, titanium isopropoxide, titanium-n-butoxide, tetrachlorotitanium, titanium diisopropoxide(bis-2,4-pentanedionate), titanium diisopropoxide(bis-2,4-ethylacetoacetate), titanium di-n-butoxide(bis-2,4-pentanedionate), titanium acetylacetonate, titanium lactate, titanium triethanolaminate, and a butyltitanium dimer.

Examples of zirconium-containing compounds useful as a nanoparticle precursor include zirconium ethoxide, zirconium isopropoxide, zirconium n-propoxide, zirconium-n-butoxide, zirconium tri-n-butoxide acetylacetonate, zirconium tri-n-butoxide bisacetylacetonate, zirconium acetylacetonate, zirconium tetraiodide and zirconium acetate.

Examples of an aluminum-containing compound useful as a nanoparticle precursor include aluminum ethoxide, aluminum isopropoxide, aluminum-n-butoxide, aluminum-s-butoxide, aluminum-di-s-butoxide acetylacetonate, aluminum-t-butoxide, alumatrane, aluminum phenoxide, aluminum acetylacetonate, and aluminum ethylacetylacetonate.

Examples of other metal-containing compounds useful as nanoparticle precursors include barium isopropoxide, calcium ethoxide, copper ethoxide, magnesium ethoxide, manganese methoxide, strontium isopropoxide, tin ethoxide, zinc methoxyethoxide, trimethoxyborane, triethoxyborane, antimony ethoxide, arsenic triethoxide, bismuth t-pentoxide, chromium isopropoxide, erbium methoxyethoxide, gallium ethoxide, indium methoxyethoxide, iron ethoxide, lanthanum isopropoxide, neodymium methoxyethoxide, praseodymium methoxyethoxide, samarium isopropoxide, vanadium tri-isobutoxide, yttrium isopropoxide, tetramethoxygermane, tetraethoxygermane, tetraisopropoxygermane, tetra-n-butoxygermane, cerium t-butoxide, hafnium ethoxide, hafnium-n-butoxide, tellurium ethoxide, molybdenum ethoxide, niobium ethoxide, niobium-n-butoxide, tantalum methoxide, tantalum ethoxide, tantalum-n-butoxide, tungsten (V) ethoxide, tungsten (VI) ethoxide, and tungsten (VI) phenoxide. Without wishing to be bound by generalization, single metal oxides typically exhibit positive intrinsic birefringence.

Two or more kinds of precursors, for example different metal alkoxides, may be added to the coating solution used to make the present nanocomposites, within the content range described above. In addition, the nanoparticle precursor may be a double metal alkoxide that has two metal atoms in the molecule. Examples of the double metal alkoxide include aluminum copper alkoxide, aluminum titanium alkoxide, aluminum yttrium alkoxide, aluminum zirconium alkoxide, barium titanium alkoxide, barium yttrium alkoxide, barium zirconium alkoxide, indium tin alkoxide, lithium nickel alkoxide, lithium niobium alkoxide, lithium tantalum alkoxide, magnesium aluminum alkoxide, magnesium titanium alkoxide, magnesium zirconium alkoxide, strontium titanium alkoxide, and strontium zirconium alkoxide. The double metal alkoxide is preferably one having a metal selected from the group consisting of aluminum, titanium and zirconium. Without wishing to be bound by generalization, many double metal oxides exhibit negative intrinsic birefringence. In accordance with the present invention, after the in-situ processing, a nanocomposite can be formed that optionally includes double metal oxide nanoparticles (e.g., barium titanium oxide nanoparticles). The nanoparticle precursor is selected to be compatible with the polymer. The compatibility of the inorganic-particle precursor fosters its interaction with, or bonding to, the polymer or its residing within the matrix of the polymer, as described further below.

Metal oxide nanoparticle intermediates, e.g. a hydroxide form, can be further converted into other salts such as carbonate and sulfate through acid base reaction. For instance, Barium hydroxide generated in-situ can be converted into barium carbonate, which exhibits negative birefringence.

Metal oxide nanoparticles are formed from the precursor by hydrolysis and condensation reactions in which a hydrogenated leaving group is a removable product from the reaction between hydrolyzed nanoparticle intermediates. The initial condensation can occur simultaneously with the hydrolysis. Final condensation preferably occurs with the evaporation of the solvent by heating. The final condensation may be completed even after the completion of the removal/drying of the solvent. Further heat treatment can be optionally employed to anneal the final nanoparticles. The amount of water in the material, the temperature, and the solvent all affect the kinetics of the condensation. Certain illustrative process parameters are provided in the Examples below.

At the completion of the condensation step, the nanoparticle may include hydroxyl surface groups, or ligand surface groups, or both. Solid state NMR can be used to determine the amount of such surface groups. Compared to prior-art nanoparticles made by laser ablation or other high temperature processes, the present nanoparticles have higher amounts of such surface groups, for example, unreacted leaving groups.

More specifically, hydrolysis is an exchange reaction that produces a nanoparticle intermediate comprising the metal with one or more hydroxide groups bonded thereto. The resulting nanoparticle intermediate may be an association of molecules surrounded by a polymer matrix. Both hydroxyl groups and ligand groups may be present in the intermediate. A condensation reaction occurs when hydroxy groups in the nanocomposite intermediate react.

In one preferred embodiment, the nanoparticle precursor is an organometallic material, for example, a metal alkoxide given by the formula:

$$R^1_y M(OR)_x \qquad (1)$$

wherein M is a metal, n is the valence of the metal M, which is typically 2 to 5, preferably 3 or 4; x=2 to n and y=0 to n-x; and R and $R^1$ are each independently selected organic substituents. In one preferred embodiment, the nanoparticle precursor is $R^1_y M(OR)_x$, where y=0 and x=4, that is, $M(OR)_4$. In one preferred embodiment, the precursor is a titanium alkoxide, more preferably, a titanium alkoxide in which the alkoxide has 3 to 6 carbon atoms.

In a preferred embodiment, all R groups are the same. In one particularly preferred embodiment x=2, 3, or 4 and y=0, 1, or 2. Preferred R groups are each independently alkyl or substituted alkyl having 1 to 12 carbon atoms. Preferred $R^1$ groups are substituted or unsubstituted alkyl, allyl, acrylate, and acetoacetate.

In one particularly preferred embodiment, involving a metallic alkoxide precursor, the reaction sequence for transforming nanoparticle precursor to nanoparticles can be schematically illustrated, in which a typical hydrolysis reaction is as follows:

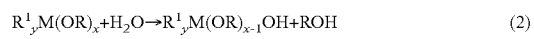

$$R^1_y M(OR)_x + H_2O \rightarrow R^1_y M(OR)_{x-1}OH + ROH \qquad (2)$$

Similarly, a typical condensation reaction is as follows:

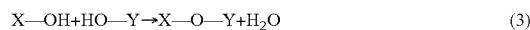

$$X\text{—}OH + HO\text{—}Y \rightarrow X\text{—}O\text{—}Y + H_2O \qquad (3)$$

wherein X and Y are independently reaction intermediates of the nanoparticle precursor, which may include the intermediate on the right side of equation (2) or condensation and/or hydrolysis products thereof. Thus, the compound or material X—O—Y can be in the form of a three dimensional network with OH, OR, or $R^1$ end groups.

This reaction sequence occurs in the presence of the polymer in the mixture, resulting in a nanocomposite of the nanoparticles in a polymer matrix, thereby forming a substantially homogeneous nanocomposite material structure.

Accordingly, the nanoparticle precursor undergoes hydrolysis in which one or more OR groups are converted to one or more OH groups, preferably at least two OH groups prior to condensation. This hydrolysis, thus, forms a nanoparticle intermediate that comprises one or more hydrolyzed metal alkoxides, a plurality of which can associate in the solution. Alcohol is formed as a reaction side product. The hydrolyzed metal alkoxide nanoparticle intermediate can then be condensed to form the nanoparticles. Metal hydroxides can initially form oligomers of metal oxides that eventually are built into the final nanoparticles.

In one preferred embodiment, the precursor is a titanium alkoxide, more preferably, a titanium alkoxide in which the alkoxide has 3 to 6 carbon atoms.

Preferably, at relatively lower loadings, the nanoparticles are characterized by average aspect ratio less than 5. In certain embodiments, these nanoparticles have maximum dimensions in the range of about 1.0 to 50 nm, more preferably 20 to 40 nm. In optical applications of nanocomposite materials, it is often useful to have nanoparticles having no dimension greater than a fraction of the wavelength of light traversing the nanocomposite. To this end, nanoparticles of the ranges mentioned reduces scattering of light and benefits optical characteristics such as transparency.

Considerations when choosing the solvent for the coating solution include the solubility of the polymer in the solvent as well as the ability to stabilize the nanoparticle precursor to prevent premature reaction of the nanoparticle precursor and its intermediates. Such stabilization is particularly desirable in the case of metal alkoxide precursors, which may be very reactive, and especially transition metal alkoxides that are relatively highly reactive. The solvent can affect the kinetics of the hydrolysis and condensation reactions.

Since the metal oxide has a weaker affinity with polymer than the precursor, stabilization of the precursor and its intermediate prior to formation of gel is desirable to prevent agglomeration.

As such, the solvent is useful in preventing the nanoparticles in the nanocomposite from reaching unacceptable size and fostering the formation of nanoparticles of relatively smaller dimensions.

The solvent can be selected to provide the polymer with the desired solubility, for example, based on a measurable solubility parameter $\chi$. The term "solubility parameter" refers to the polymer-solvent interaction parameter, $\chi$, which is defined in the following equation:

$$\Delta G_m = RT[n_1 \ln \phi_1 + n_2 \ln \phi_2 + n_1 \phi_2 \chi] \quad (4)$$

where: $\Delta G_m$ is the Gibbs energy of mixing; T is the temperature; R is a known constant; and subscripts 1 and 2 refer to the polymer and solvent, respectively; n is the molar fraction; and $\phi$ is the volume fraction. Notably, the lower the value of $\Delta G_m$, the more favorable the interaction is between the polymer and the solvent. Therefore, a lower $\chi$ represents a good interaction. Numerous techniques can be used to measure $\chi$ such as scattering, vapor pressure methods, and similar methods. The value of $\chi$ may also be calculated based on information from standard references known to the skilled artisan. Preferably, the solubility parameter is less than about 1.0.

The solvent used in the coating solution solvates or dissolves the polymer and the nanoparticle precursor. Preferably, the solvent provides a solution of the polymer in which the polymer chains can fully extend and, more preferably, in which the extended polymer chains can sufficiently interact with the inorganic particle precursor to contribute to the homogenous dispersion of the precursor and its intermediates.

The solvent can be one or more of a variety of known organic solvents. The solvent can be polar or non-polar, depending on the other components of the coating solution. For example, polar solvents include alcohols, glycols, amides, ethers, ketones and halogenated organic solvent, whereas non-polar solvents include benzene, xylene, and dioxane. Some solvents can be used possessing intermediate polarity such as THF and ethanol.

Examples of good solvents include ketones such as acetone, methyl ethyl ketone, cyclopentanone, and cyclohexanone; ethers such as tetrahydrofuran (THF), 1,4-dioxane, 1,3-dioxolane, and 1,2-dimethoxyethane; esters such as methyl formate, ethyl formate, methyl acetate, ethyl acetate, amyl acetate, and gamma-butyrolactone; methylcellosolve; dimethylimidazolinone; dimethylformamide; dimethylacetoamide; acetonitrile; dimethylsulfoxide; sulfolane; nitroethane; and methylene chloride. Preferred solvents include butanol, dimethylene chloride, benzene and THF. A mixture of solvents can be used.

Alcohols can be used to protect the ligand or leaving group of a transition metal alkoxide or other relatively reactive nanoparticle precursor, which precursors are reactive and prone to hydrolyze and polymerize. Such alcohols thereby can slow down the hydrolysis and condensation. In a preferred embodiment, the carrier liquid for the coating solution used to make the present nanocomposite comprises an organic solvent that is ethylene glycol or a compound having at least three carbon atoms and at least one hydroxy group, for example, butanol, isopropyl alcohol, or ethylene glycol. Such alcohols are preferably present in the coating solution in minor amounts in combination with one or more other organic solvents. Preferably, the carrier liquid is essentially free of methanol or ethanol, which tend to contain excessive amounts of water.

The concentration of the carrier liquid, or solvent, in the coating solution used to make the present nanocomposite is such that the polymer chain is uncoiled. The concentration of solvent in the coating solution is illustratively in the range of about 1% to about 50% by weight. More illustratively, the concentration is in the range of between about 2% to about 15% by weight.

The polymer (or matrix polymer) used to make the present nanocomposite may be either an addition polymer or a condensation polymer. The nanocomposite can comprise a sole polymer, two polymers or a plurality of two or more polymers of the same or different birefringence, including combinations of positive and negative birefringence to control the overall birefringence dispersion of the nanocomposite. The main contributor to the birefringence of the nanocomposite of the present invention, whether the sole polymer or one of a mixture of polymers, is referred to as the "birefringence polymer" or "primary polymer." The birefringence polymer of the matrix polymer comprises an amorphous synthetic polymer having a chromophore.

With respect to polymers, the term "amorphous" means a lack of long-range order. Thus, an amorphous polymer does not show long-range order as measured by techniques such as X-ray diffraction.

The term "chromophore" is defined as an atom or group of atoms that serve as a unit in light adsorption. (*Modern Molecular Photochemistry*, Nicholas J. Turro, Ed., Benjamin/Cummings Publishing Co., Menlo Park, Calif. (1978), pg 77.

Typical chromophore groups for use in the polymers used in the present invention include vinyl, carbonyl, amide, imide, ester, carbonate, aromatic (i.e., heteroaromatic or carbocyclic aromatic such as phenyl, naphthyl, biphenyl, thiophene, bisphenol), sulfone, and azo or combinations of these chromophores. A non-visible chromophore is one that has an absorption maximum outside the range of $\lambda = 400$-$700$ nm.

The relative orientation of the chromophore to the optical axis of a polymer chain determines the sign of $\Delta n_{int}$. If placed in the main chain, the $\Delta n_{int}$ of the polymer will be positive and, if the chromophore is placed in the side chain, the $\Delta n_{int}$ of the polymer will be negative.

Examples of negative $\Delta n_{int}$ polymers include materials having non-visible chromophores off of the polymer backbone. Such non-visible chromophores, for example, include: vinyl, carbonyl, amide, imide, ester, carbonate, sulfone, azo, and aromatic heterocyclic and carbocyclic groups (e.g., phenyl, naphthyl, biphenyl, terphenyl, phenol, bisphenol A, and thiophene). In addition, combinations of these non-visible chromophores may be desirable (i.e., in copolymers). Examples of such polymers and their structures are poly(methyl methacrylate), poly(4 vinylbiphenyl) (Formula I below), poly(4 vinylphenol) (Formula II), poly(N-vinylcarbazole) (Formula III), poly(methylcarboxyphenylmethacrylamide) (Formula IV), polystyrene, poly[(1-acetylindazol-3-ylcarbonyloxy)ethylene] (Formula V), poly(phthalimidoethylene) (Formula VI), poly(4-(1-hydroxy-1-methylpropyl)styrene) (Formula VII), poly(2-hydroxymethylstyrene) (Formula VIII), poly(2-dimethylaminocarbonylstyrene) (Formula IX), poly(2-phenylaminocarbonylstyrene) (Formula X), poly(3-(4-biphenylyl)styrene) (XI), and poly(4-(4-biphenylyl)styrene) (XII),

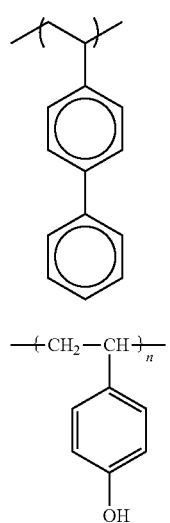

(I)

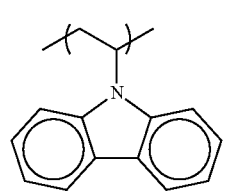

(II)

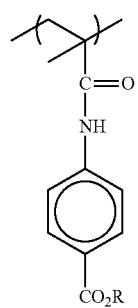

(III)

(IV)

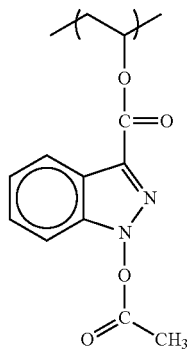

(V)

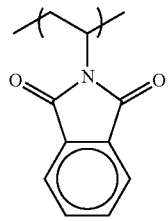

(VI)

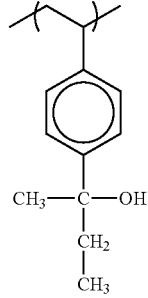

(VII)

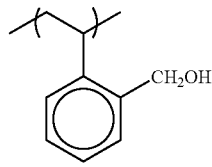

(VIII)

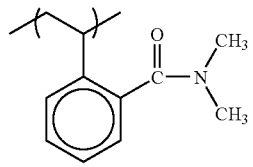

(IX)

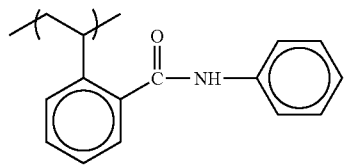

(X)

-continued

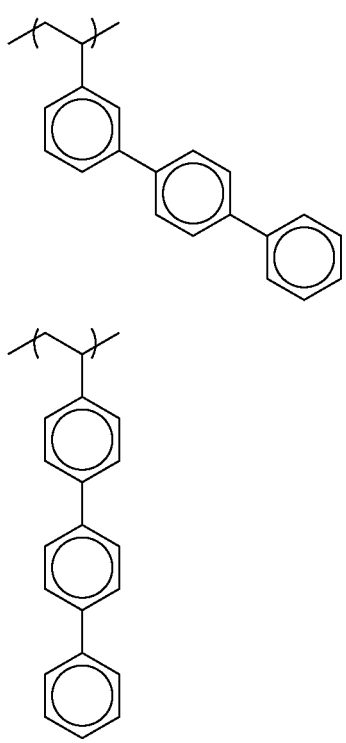

Examples of positive $\Delta n_{int}$ polymers include materials that have non-visible chromophores on the polymer backbone. Such non-visible chromophores, for example, include: vinyl, carbonyl, amide, imide, ester, carbonate, sulfone, azo, and aromatic heterocyclic and carbocyclic groups (e.g., phenyl, naphthyl, biphenyl, terphenyl, phenol, bisphenol A, and thiophene). In addition, polymers having combinations of these non-visible chromophores may be desirable (i.e., in copolymers). Examples of such polymers are polyesters, polycarbonates, polysulfones, polyketones, polyamides, and polyimides containing the following monomers:

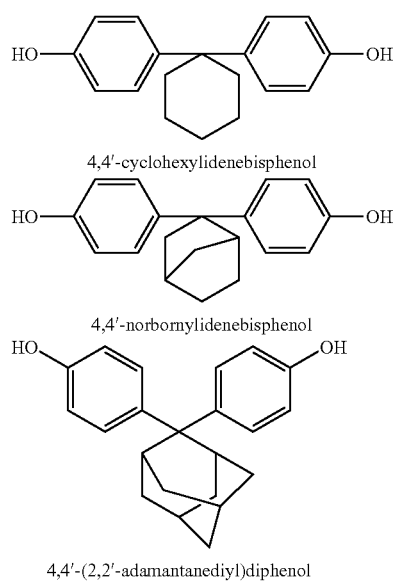

4,4'-cyclohexylidenebisphenol 4,4'-norbornylidenebisphenol 4,4'-(2,2'-adamantanediyl)diphenol

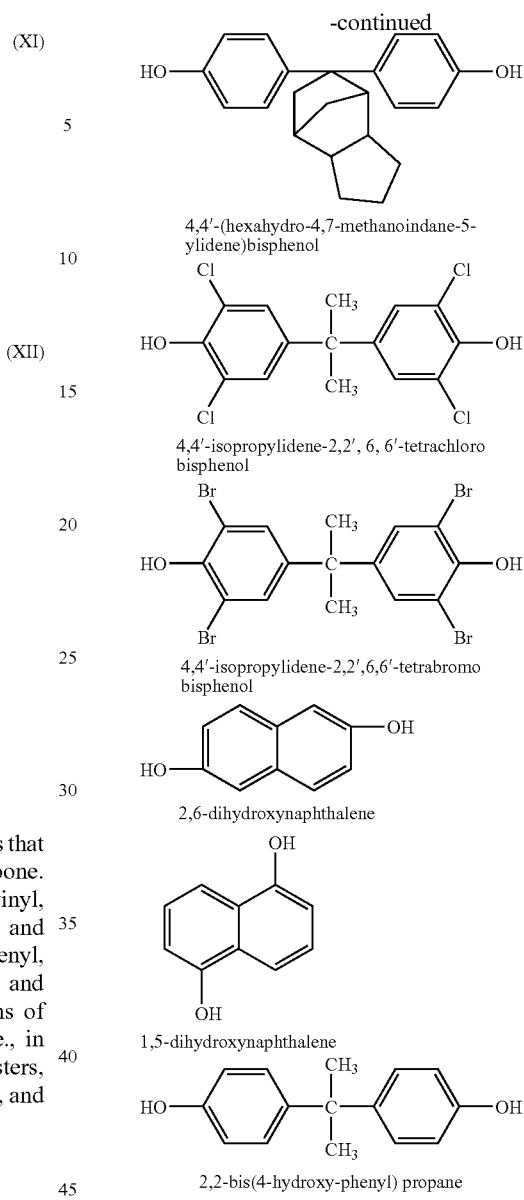

4,4'-(hexahydro-4,7-methanoindane-5-ylidene)bisphenol 4,4'-isopropylidene-2,2', 6, 6'-tetrachloro bisphenol 4,4'-isopropylidene-2,2',6,6'-tetrabromo bisphenol 2,6-dihydroxynaphthalene 1,5-dihydroxynaphthalene 2,2-bis(4-hydroxy-phenyl) propane Preferably, the polymer has an affinity to the surface of the nanoparticle precursor, nanoparticle intermediate, and/or nanoparticle product, which fosters a more thermodynamically favorable homogenous dispersion. The surface of the nanoparticle typically comprises —OH or ligand groups (for example, an OR group when using an alkoxide precursor), both of which are good electron donors. Thus, the presence of electron-acceptive functional groups on the polymer can provide or enhance affinity of the polymer to the surface of the nanoparticles, including hydrogen bonding. Functional groups in the polymer such as carbonyl, acid, amide and ester are known as strong acceptors of acidic hydrogen and can form hydrogen bonding with the OH groups of the nanoparticle intermediate. These groups can be present either in the backbone, side chain or the terminal end of the polymer, to compatibilize the nanoparticles or intermediate thereof with the polymer matrix.

Additionally, Van derWaals forces can enhance the affinity of the nanoparticles and polymer. Such interactions between the nanoparticles and polymer are believed to aid the homogenous dispersion of the polycondensation product and prevent undesirable agglomeration that can lead to larger particles that can adversely affect transparency of the nanocomposite, resulting in undesirable haze.

The compatibility of the nanoparticle precursor with the polymer can also derive from chemical bonding and coordination.

In one particular embodiment, reactive functional groups that can be present in the polymer chain to react with the nanoparticle precursor and nanoparticle intermediate, to form chemical bonding, include metal alkoxide functional groups represented by the following formula:

$$—C-M-R_x—OR'_y \quad (5)$$

wherein M is Si or a metal atom selected from the group consisting of Si, Ti, Zr, and Sn; each R and R' are independently an organic moiety; x is 0, 1, 2 or 3, y is 1, 2, 3, or 4 and the sum of x and y is equal or less than 4. Such groups can react with the nanoparticle precursor or nanoparticle intermediate to form a chemical bonding. Other coupling chemistry can be used as well.

The following Table 2 lists various values for intrinsic birefringence $\Delta n_{int}$ for typical polymers used in optical films:

TABLE 2

| Polystyrene | $\Delta n_{int} = -0.100$ |
|---|---|
| Polyphenylene oxide | $\Delta n_{int} = +0.210$ |
| Polycarbonate | $\Delta n_{int} = +0.106$ |
| Polymethyl methacrylate | $\Delta n_{int} = -0.0043$ |
| Polyethylene terephthalate | $\Delta n_{int} = +0.105$ |

As evident by the $\Delta n_{int}$ value for polymethylmethacrylate, acrylic polymers, for example polymethylmethacrylate (PMMA), are preferred for obtaining zero birefringence dispersion in a nanocomposite according to the present invention. A preferred polymer for obtaining reverse dispersion is a negative $\Delta n_{int}$ vinyl polymer such as poly(vinylcarbazole) or a positive $\Delta n_{int}$ condensation polymer such as polyetherimide.

In nanocomposite films according to the present invention, in order to obtain a pre-selected controlled dispersion, the nanoparticles and polymer can each have an intrinsic birefringence $\Delta n_{int}$ that is, respectively, of opposite sign to each other. For example, the intrinsic birefringence $\Delta n_{int}$ of the polymer can be negative while the intrinsic birefringence $\Delta n_{int}$ of the inorganic nanoparticle can be positive. Alternatively, the intrinsic birefringence $\Delta n_{int}$ of the polymer can be positive, while the intrinsic birefringence $\Delta n_{int}$ of the inorganic nanoparticle can be negative.

By suitable selection of polymer and nanoparticles, birefringence dispersion can be controlled to obtain a nanocomposite film exhibited reverse dispersion and simultaneously satisfying the following three conditions:

$$|\Delta n_{th}(\lambda_2)| - |\Delta n_{th}(\lambda_1)| > 0 \text{ for } 400 \text{ nm} < \lambda_1 < \lambda_2 < 650 \text{ nm} \quad (i)$$

$$|n_x - n_y| < 0.0001 \quad (ii)$$

$$\Delta n_{th}(450 \text{ nm})/\Delta n_{th}(550 \text{ nm}) < 0.98, \text{ preferably } 0.95 \quad (iii)$$

In an alternative embodiment, birefringence dispersion can be controlled to obtain a nanocomposite film exhibiting essentially flat dispersion and satisfying the following condition:

$$0.95 < |\Delta nth(\lambda_4)|/|\Delta nth(\lambda_5)| < 1.050, \text{ for all } \lambda_4 \approx \lambda_5,$$
$$\text{wherein } 400 \text{ nm} < \lambda_4, \lambda_5 < 650 \text{ nm} \quad (iv)$$

In a more preferred embodiment, the nanocomposite film satisfies the following condition:

$$0.98 < |\Delta nth(\lambda_4)|/|\Delta nth(\lambda_5)| < 1.020, \text{ for all } \lambda_4 \approx \lambda_5,$$
$$\text{wherein } 400 \text{ nm} < \lambda_4, \lambda_5 < 650 \text{ nm} \quad (iv-a)$$

In the case of a nanocomposite film designed for positive birefringence $\Delta$nth the film satisfies the following condition:

$$\Delta nth(\lambda) > 0 \text{ for } 400 \text{ nm} < \lambda < 650 \text{ nm} \quad (vi),$$

whereas in the case of a nanocomposite designed fro negative birefringence $\Delta$nth satisfies the following condition:

$$\Delta nth(\lambda) < 0 \text{ for } 400 \text{ nm} < \lambda < 650 \text{ nm} \quad (vii).$$

In yet another embodiment of the present invention, birefringence dispersion can be controlled to obtain a nanocomposite film exhibiting essentially zero birefringence and satisfying the following condition:

$$|\Delta nth(\lambda_6)| < 0.0001 \text{ for } 400 \text{ nm} < \lambda_6 < 650 \text{ nm} \quad (v).$$

The following examples illustrate the practice of this invention. They are not intended to be exhaustive of all possible variations of the invention. Parts and percentages are by weight unless otherwise indicated.

EXAMPLES

In the following experiments, the in-plane birefringence $\Delta n_{th}$ and transmittance were measured using a WOOLLAM-2000V Spectroscopic Ellipsometer.

The term "D" is defined as follows as the ratio of the birefringence at wavelength 450 nm to the birefringence at 550 nm: $D = \Delta n_{th} (450 \text{ nm})/\Delta n_{th} (550 \text{ nm})$.

Example 1

Figure 5A:
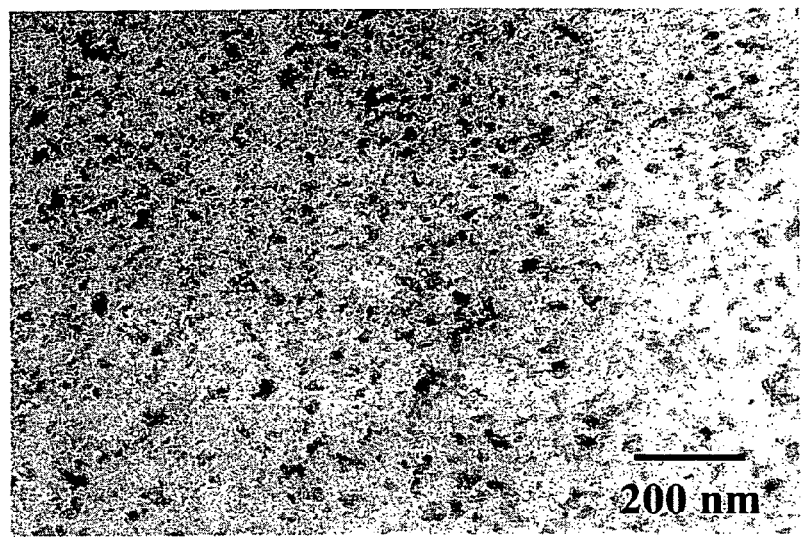
FIG. 5A is a transmission electron microscopy (TEM) image of the nanocomposite material of Example 1.

A solution of 15 wt % of polystyrene (PS) (Dow Chemical, Inc., MI) in toluene was prepared. Next, titanium isopropoxide (TIP) (Aldrich Chemical, Pa.) was added drop-wise to the solution under vigorous stirring. The resultant weight ratio of TIP to PS was 10 to 90. A clear solution was formed. The solution was coated using a doctor blade on a 100 micrometer (4 mil) thick PET substrate at room temperature in ambient environment of 20% RH. The coating was dried in ambient condition (20% RH at 21° C.) for 24 hours. The film was further annealed at 100° C. under vacuum for 2 hours. A freestanding nanocomposite film having titanium oxide nanoparticles of 3 wt %, and having a thickness of 20 μm was peeled off. The film was optically transparent. The birefringence of the film was measured using the M-2000V® Spectroscopic Ellipsometer. TEM analysis of a thin microtomed section showed that the titanium-oxide nanoparticles were homogenously distributed in the mixture with a morphology in which the dark contrast titanium-oxide rich regions were mainly less than 50 nm in size, as shown in FIG. 5A.

Comparative Example 1

A solution of 15 wt % of polystyrene (PS) (Dow Chemical, MI) in toluene was prepared. The solution was coated using a doctor blade on bare 100 micron (4 mil) thick PET substrate at room temperature in ambient environment of 20% RH. The coating was dried in ambient condition (20% RH at 21° C.) for 24 hours. A PS film of 20 micrometers thickness was then peeled off. The film was optically transparent. The particle size was between 2 to 70 nm according to TEM. The birefringence of the film was measured using M-2000V® Spectroscopic Ellipsometer.

Figure 5B:
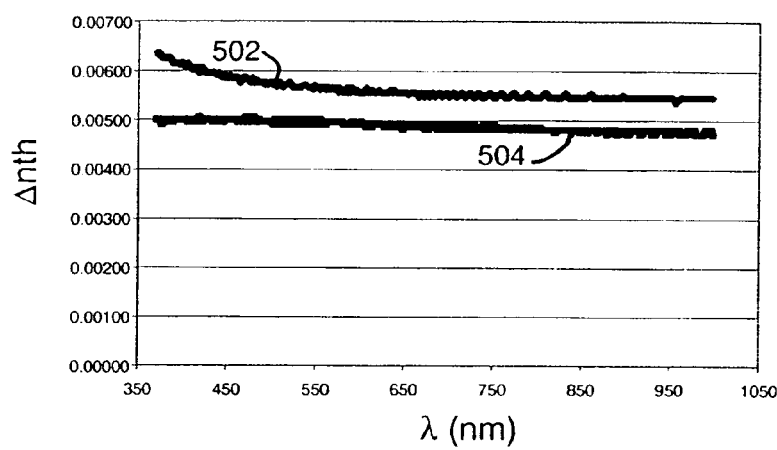
FIG. 5B shows the birefringence spectra of a film according to Example 1 and Comparative Example 1, in which the latter film has normal birefringence dispersion and the former film has an essentially flat dispersion in $\Delta n_{th}$ in accordance with the present invention.

The birefringence spectra of the films of Example 1 and Comparative Example 1 are shown in FIG. 5. The figure shows that, while the PS film has normal birefringence dispersion (curve 502), an essentially flat dispersion in $\Delta n_{th}$ (curve 504) is achieved in accordance with the present invention.

Example 2

A solution of 2 wt % of PVK (poly(9-vinylcarbazole) (Aldrich Chemical, Pa.) in toluene was prepared. Next, 20 wt % of titanium isopropoxide (TIP)(Aldrich Chemical, Pa.) in toluene was prepared. The TIP solution was added drop-wise to the PVK solution under vigorous stirring. The resultant weight ratio of TIP to PVK was 50 to 50. A clear solution was formed. The solution was coated using a doctor blade of 25 micrometer (1 mil) gap on glass at room temperature in ambient environment of 20% RH. The coating was dried in ambient condition (20% RH at 21° C.) for 2 hours. The coating was further dried at 70° C. under vacuum for overnight, resulting in a nanocomposite film having titanium oxide nanoparticles in the amount of 22 wt %. The film was optically transparent. The birefringence of the film was measured using M-2000V® Spectroscopic Ellipsometer.

Comparative Example 2

A solution of 2 wt % of PVK (poly(9-vinylcarbazole) (Aldrich Chemical, Pa.) in toluene was prepared. The solution was coated using a doctor blade of 25 micrometer (1 mil) on a glass substrate at room temperature in ambient environment of 20% RH. The coating was dried in ambient condition (20% RH at 21° C.) for 2 hours. The coating was further dried at 70° C. under vacuum for overnight. The film was optically transparent. The birefringence of the film was measured using the M-2000V® Spectroscopic Ellipsometer.

Figure 6:
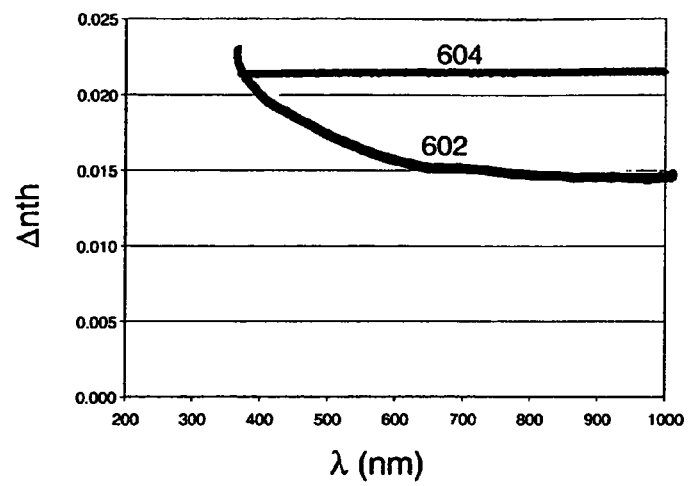
FIG. 6 shows the birefringence spectra of a film according to Example 2 and Comparative Example 2, wherein the comparative film showed a normal birefringence dispersion in $\Delta n_{th}$ and a nanocomposite film in accordance with the present invention showed an essentially flat out-of-plane birefringence dispersion.

The birefringence spectra of the films of Example 2 and Comparative Example 2 are shown in FIG. 6. The figure shows that, while the comparative PVK film had a normal birefringence dispersion in $\Delta n_{th}$ (602), the nanocomposite film in accordance with the present invention showed an essentially flat out-of-plane birefringence dispersion (604).

Example 3

A solution of 5 wt % of PVK (poly(9-vinylcarbazole) (Aldrich Chemical, Pa.) in toluene was prepared. Next, titanium isopropoxide (TIP)(Aldrich Chemical, Pa.) was added drop-wise to the PVK solution under vigorous stirring. The resultant weight ratio of TIP to PVK was 30 to 70. A clear solution was formed. The solution was coated using a doctor blade of 25 micrometer (1 mil) gap on glass at room temperature in ambient environment of 20% RH. The coating was dried in ambient condition (20% RH at 21° C.) for 2 hours. The coating was further dried at 70° C. under vacuum for overnight, resulting in a nanocomposite film having titanium oxide nanoparticles in the amount of 22 wt %. The film was optically transparent. The birefringence of the film was measured using the M-2000V® Spectroscopic Ellipsometer.

Figure 7:
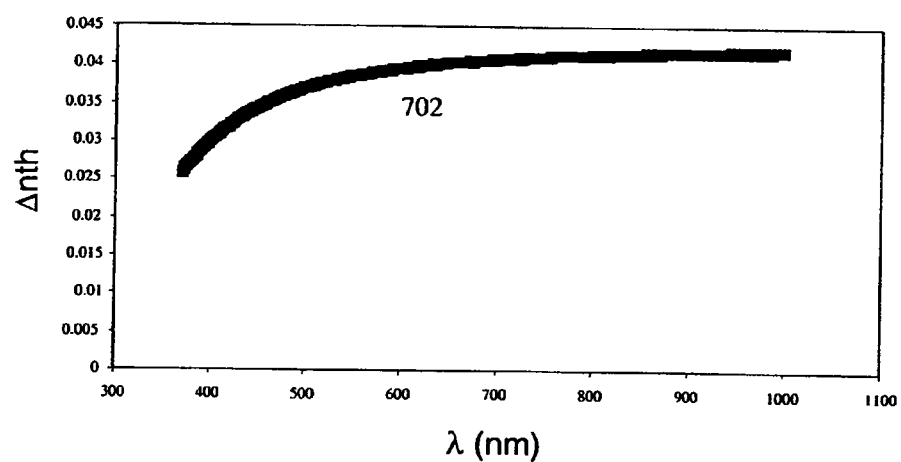
FIG. 7 shows the birefringence spectra of a film according to Example 3 in which the film exhibits a reverse dispersion in $\Delta n_{th}$.

The coating exhibits a reverse dispersion in $\Delta n_{th}$ (curve 702) as shown in figure FIG. 7.

Table 3 below summarizes the birefringence of the above Examples and Comparative Examples. It is shown that the nanocomposite films according to the present invention can exhibit either flat or reverse dispersion.

TABLE 3

| Example | P Composition | Dispersion Behavior | D = $\Delta n_{th}$ (450 nm)/ $\Delta n_{th}$ (550 nm) | $\Delta n_{th}$ at 550 nm |
|---|---|---|---|---|
| Example 1 | PS/TIP (90/10) | flat | 1.003 | 0.0049 |
| Example 2 | PVK/TIP (50/50) | flat | 1 | 0.021 |
| Example 3 | PVK/TIP (30/70) | reverse | 0.89 | 0.038 |
| Comparative Example 1 | PS | Normal | 1.04 | 0.0056 |
| Comparative Example 2 | PVK | Normal | 1.18 | 0.018 |

Example 4

This Example and the following Example 5 illustrates and embodiment of the present invention in which a film exhibits low and constant $\Delta n_{th}$. The precursor TIP and balance organic solvent DCM (dichloromethane) was added drop-wise to a solution consisting of 20 wt.% PMMA in DCM by weight under vigorous stirring using a COWELS mixer. The resulting weight ratio of TIP to PMMA was 5:95. Following the addition of the TIP solution, sonication was utilized to remove bubbles. The resulting sonicated mixture was then applied on bare polyester sheet at a controlled temperature of 21° C. and RH of 30% using a doctor blade. The coated polyester sheet was immediately covered to slow the rate of drying using a prefabricated box.

After 60 minutes, the dried film was scored with a razor blade and lifted from the polyester carrier sheet. The resulting freestanding film was dried in a vacuum oven at 50° C. overnight.

The resultant film was optically clear and had a thickness of 33 micrometers.

Example 5

The precursor TIP and balance organic solvent DCM was added drop-wise to a solution consisting of 20 wt. % PMMA in DCM by weight under vigorous stirring using a COWELS mixer. The resulting weight ratio of TIP to PMMA was 5:95. Following the addition of the TIP solution, sonication was utilized to remove bubbles. The resulting sonicated mixture was then applied on bare polyester sheet at a controlled temperature of 21° C. and RH of 30% using a doctor blade. The coated polyester sheet was immediately covered to slow the rate of drying using a prefabricated box.

After 60 minutes, the dried film was scored with a razor blade and lifted from the polyester carrier sheet. The resulting freestanding film was dried in a vacuum oven at 50° C. overnight. The resultant film was optically clear and had a thickness of 74 micron.

Comparative Example 3

A solution of 20 wt. % PMMA was made in DCM. The solution was then applied on bare polyester sheet at a controlled temperature of 21° C. and RH of 30% using a doctor blade. The coated polyester sheet was immediately covered to slow the rate of drying using a prefabricated box.

After 60 minutes, the dried film was scored with a razor blade and lifted from the polyester carrier sheet. The resulting freestanding film was dried in a vacuum oven at 50° C. overnight. The resultant film was optically clear and had a thickness of 28 micron. The following Table illustrates the optical transmission and the birefringence of the resulting films.

TABLE 4

|  | Thickness (μ) | % Transmission (@ 590 nm) | Birefringence in plane | Out-of-plane, $\Delta n_{th}$ |
|---|---|---|---|---|
| Example 4 | 33 | 91.9 | <0.0001 | <0.0001 |
| Example 5 | 74 | 90.3 | <0.0001 | <0.0001 |
| Comparative Example 3 | 28 | 91.9 | <0.0001 | 0.0002 |

Figure 8:
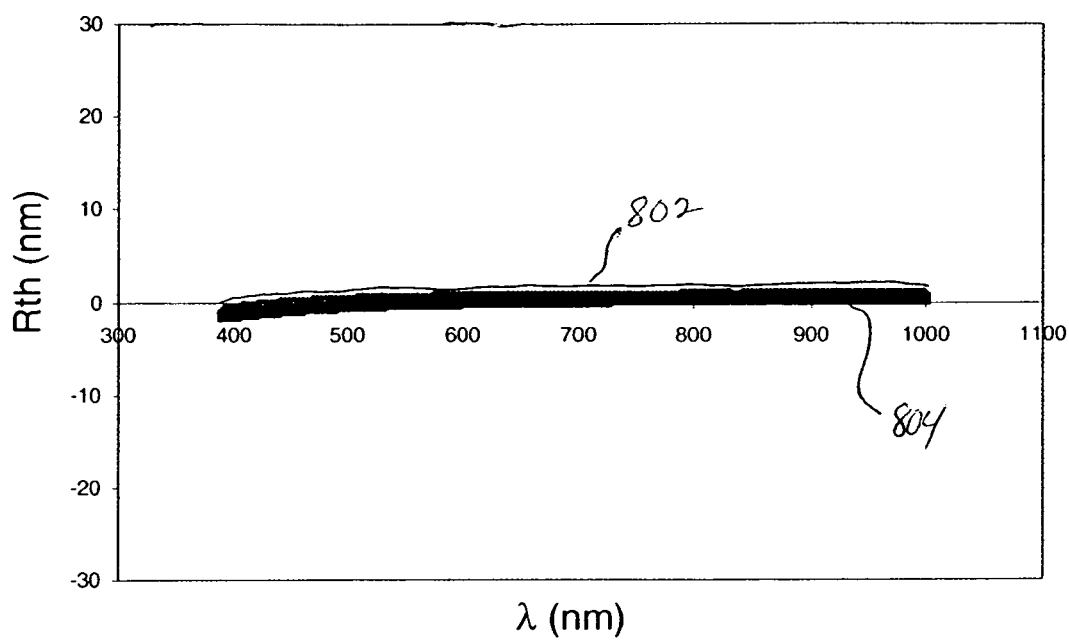
FIG. 8 shows the retardation $R_{th}$ of the film according to Examples 4 and 5 of the present invention in with the retardations are below 2 nm in the wavelength range of 400 nm to 1100 nm.

Based on the results shown in Table 3, Example 4, Example 5, and Comparative Example 3 show essentially zero in-plane birefringence indicating that they have the properties of a C-plate. Further, the $\Delta n_{th}$ is also effectively zero for Examples 4 and 5. Comparative Example 3, on the other hand, has a finite value of $\Delta n_{th}$=0.0002. FIG. 8 further illustrates that the $R_{th}$ of the film of Example 4 (802) and Example 5 (804) are below 2 nm in the wavelength range of 400 nm to 1100 nm. Thus corresponding value of $|\Delta n_{th}|$ is less than 0.0001 for all wavelength between 400 nm and 1100 nm.

The invention claimed is:

1. A nanocomposite film comprising nanoparticles dispersed in a polymer matrix comprising at least one polymer, wherein the nanoparticles have been generated in situ in the polymer matrix, and wherein said film simultaneously satisfies the following three conditions:

$$|\Delta n_{th}(\lambda_2)|-|\Delta n_{th}(\lambda_1)|>0 \text{ for } 400 \text{ nm}<\lambda_1<\lambda_2<650 \text{ nm} \qquad (i)$$

$$|n_x-n_y|<0.0001 \qquad (ii)$$

$$\Delta n_{th}(450 \text{ nm})/\Delta n_{th}(550 \text{ nm})<0.98, \qquad (iii)$$

wherein the polymer is characterized by negative intrinsic birefringence and is selected from the group consisting of vinyl carbazole or styrene, and copolymers thereof and the nanoparticles include titanium oxide nanoparticles.

2. A nanocomposite film comprising nanoparticles dispersed in a polymer matrix comprising at least one polymer, wherein the nanoparticles have been generated in situ in the polymer matrix, and wherein said film satisfies the following condition:

$$0.95<|\Delta nth(\lambda_4)|/|\Delta nth(\lambda_5)|<1.050, \text{ for all } \lambda_4 \approx \lambda_5 \text{ wherein } 400 \text{ nm}<\lambda_4,\lambda_5<650 \text{ nm} \qquad (iv)$$

wherein the polymer is characterized by negative intrinsic birefringence and is selected from the group consisting of vinyl carbazole or styrene, and copolymers thereof and the nanoparticles include titanium oxide nanoparticles.

3. The nanocomposite film according to claim 2 wherein said film satisfies the following condition:

$$0.98<|\Delta nth(\lambda_4)|/|\Delta nth(\lambda_5)|<1.020, \text{ for all } \lambda_4 \approx \lambda_5 \text{ wherein } 400 \text{ nm}<\lambda_4,\lambda_5<650 \text{ nm} \qquad (iv-a).$$

4. The nanocomposite film according to claim 1 or 2 wherein said film satisfies the following condition:

$$\Delta nth(\lambda)>0 \text{ for } 400 \text{ nm}<\lambda<650 \text{ nm} \qquad (vi).$$

5. A film according to claim 1 or 2 wherein said film satisfies the following condition:

$$\Delta nth(\lambda)>0 \text{ for } 400 \text{ nm}<\lambda<650 \text{ nm} \qquad (viii).$$

6. The nanocomposite film of claim 1 or 2 wherein the titanium oxide nanoparticles and polymer each have an intrinsic birefringence $\Delta n_{int}$ that is, respectively, of opposite sign to each other.

7. The nanocomposite film of claim 1 or 2 wherein the polymer matrix comprises more than one polymer and the titanium oxide nanoparticles comprise more than one metallic oxide.

8. The nanocomposite film of claim 1 or 2 wherein the titanium oxide nanoparticles are the product of a condensation polymerizable reactive metal compound comprising a metal atom and at least two hydrolyzable leaving groups, and wherein the titanium oxide nanoparticles in the nanocomposite are homogenously dispersed.

9. The nanocomposite film of claim 8 wherein the metal atom is a transition metal or a metal in Group 3B or 4B of the Periodic Table.

10. The nanocomposite film of claim 9, wherein the metal atom is selected from the group consisting of aluminum, titanium, tin, indium, and zirconium.

11. The nanocomposite film of claim 1 or 2 comprising predominantly nanoparticles having a maximum dimension of not more than 50 nm.

12. The nanocomposite film of claim 1 or 2 wherein the nanocomposite is at least about 85% transmissive for light having a wavelength of about 550 nm.

13. The nanocomposite film of claim 1 or 2 wherein the thickness of the nanocomposite film is in the range of 10 nm to 200 micrometer.

14. The nanocomposite film of claim 1 wherein the concentration of the nanoparticles is 5.0 to 25 percent by weight of the nanocomposite and the nanoparticles in the nanocomposite are homogenously dispersed and comprise a plurality of nanoparticles having a shorter dimension of not more than 50 nm, as determined by transmission electron microscopy, and characterized by a morphology of elongated strands or dense packing.

15. A display device employing at least one nanocomposite film according to claim 1 or 2.

16. The display device of claim 15 wherein the nanocomposite film is an optical element in a liquid crystal display and wherein the film is coated on a transparent substrate.

17. The display device of claim 16 wherein the substrate is a polarizer protective film.

18. The display device of claim 15 wherein the nanocomposite film is a polarizer protective film.

19. A display device employing at least one nanocomposite film according to claim 1 or 2 wherein the film is a transparent compensation film.

20. A method of fabricating the nanocomposite material of claim 1 in the form of a film, the method comprising generating titanium oxide nanoparticles in-situ within a polymer matrix by:

(a) forming a coating solution of a titanium oxide nanoparticle precursor and polymer dissolved in a substantially non-aqueous carrier liquid comprising one or more organic solvents, wherein titanium oxide nanoparticle precursor is a condensation polymerizable reactive metal compound comprising a metal atom and at least two hydrolyzable leaving groups;

(b) applying the coating solution onto a substrate to form a coating and then removing organic solvent from the coating, thereby forming a gel;

(c) converting the titanium oxide nanoparticle precursor into titanium oxide nanoparticles in a polymer matrix to form a nanocomposite; and (d) drying the nanocomposite to remove remaining organic solvent from the nanocomposite.

21. The method of claim 20 wherein the components of the coating solution in step (a) are selected such that the titanium oxide nanoparticle precursor is essentially stable and unreacted prior to applying the coating solution onto the substrate.

\* \* \* \* \*